United States Patent [19]
Heinrich et al.

[11] B 3,992,641

[45] Nov. 16, 1976

[54] POLYPHASE DISC RELUCTANCE MOTOR

[75] Inventors: Theodore M. Heinrich, Murrysville; Suresh K. Bhate, Pittsburgh, both of Pa.

[73] Assignee: Westinghouse Electric Corporation, Pittsburgh, Pa.

[22] Filed: Nov. 22, 1974

[21] Appl. No.: 526,289

[44] Published under the second Trial Voluntary Protest Program on February 24, 1976 as document No. B 526,289.

[52] U.S. Cl. .............................. 310/168; 310/114; 310/268; 310/49 R
[51] Int. Cl.² ...................................... H02K 17/42
[58] Field of Search ............ 310/168, 268, 162–165, 310/49, 112, 114, 126

[56] References Cited
UNITED STATES PATENTS

| | | | |
|---|---|---|---|
| 3,230,406 | 1/1966 | Henry et al. | 310/268 X |
| 3,327,191 | 6/1967 | Goto | 310/49 X |
| 3,343,014 | 9/1967 | Giles | 310/49 |
| 3,401,284 | 9/1968 | French | 310/168;268 X |
| 3,401,323 | 9/1968 | French | 318/138 |
| 3,411,059 | 11/1968 | Kaiwa | 310/49 X |
| 3,437,854 | 4/1969 | Oiso | 310/49 |
| 3,549,918 | 12/1970 | Croymans | 310/49 |
| 3,700,944 | 10/1972 | Heintz | 310/168 |

*Primary Examiner*—Donovan F. Duggan
*Attorney, Agent, or Firm*—G. H. Telfer

[57] ABSTRACT

A plurality of single phase arrays have disc-type rotors and stators and are supported in tandem with adjacent arrays separated by magnetic partitions. Polyphase operation is achieved by time shifting the dynamic magnetic field induced within the $N^{th}$ array with respect to the dynamic magnetic field induced within the $(N-1)^{st}$ array. A static magnetic field structure provides optimum power factor with respect to maximum average torque. A disc structure is provided which realizes maximum available starting torque regardless of rotor position.

12 Claims, 4 Drawing Figures

POLYPHASE DISC RELUCTANCE MOTOR

BACKGROUND OF THE INVENTION

1. Field of the Invention

This invention relates to rotary dynamoelectric machines, and particularly to disc-type variable reluctance motors.

2. Description of the Prior Art

Electromechanical energy conversion devices operate according to certain basic physical laws, one of which is known as the variable reluctance principle. According to that principle, in the operation of an electromechanical energy conversion device forces are established which tend to decrease the reluctance of the mechanical structure by moving its mechanical parts toward the configuration of minimum reluctance. This principle has been used in a variety of devices for producing mechanical force or torque, and for producing continuous rotation of a shaft.

Rotary dynamoelectric machines which utilize the variable reluctance principle are presently available in a wide variety of designs adapted for particular use as a motor or generator, for use with alternating or direct current systems, and for producing certain specific performance characteristics. The most common of these machines generally utilizes a rotor turning within an annular stator, the two components being separated by a concentric annular air gap. In such machines the primary electromagnetic field is directed radially with respect to the axis of rotation.

A distinctly different variable reluctance configuration employs mutually rotatable members constructed in the form of discs which are axially spaced from one another. At least one disc portion is axially spaced from another disc portion to define at least one radial air gap extending between adjacent pairs of these disc portions. At least one of these disc portions is stationary and constitutes a machine stator and at least one other disc portion is rotatable and constitutes a machine rotor. Each disc is composed of alternate magnetic segments and high resistivity non-magnetic segments. The primary electromagnetic field, produced by an annular solenoid which circumscribes the stator discs, is axially directed through the magnetic circuit formed by the interleaved rotor and stator discs. Such a machine has been described by P. French, U.S. Pat. No. 3,401,284, Sept. 10, 1968.

The rotary disc variable reluctance configuration is particularly useful in the design of AC synchronous reluctance motors where high power density ratios are required. To a first approximation, the power output of some conventional motors, such as AC induction motors and DC motors, is proportional to motor volume and output shaft speed. Changing the number of poles and the frequency of excitation has no significant effect on the power output of such motors as long as the shaft speed is fixed; that is to say the horsepower-to-weight ratio or the power density of the motor cannot be significantly altered by changing the characteristics of the input electrical power if the output mechanical shaft speed is constant. However, the power density of disc-type reluctance motors does respond to changes in the frequency of excitation. This characteristic can be used to advantage when variable speed drives are utilized since the frequency of excitation may be chosen at the convenience of the designer.

The disadvantage of prior art disc reluctance motors is that the input power factor, as defined by the ratio of watts input to VA input, is extremely low (typically 0.1 to 0.2). Also the ratio of peak torque to average torque is approximately 3.0 for the single phase disc reluctance machine. Further, in the single phase disc reluctance machine it is possible to stop the rotor in a position in which the rotor magnetic segments are completely aligned or are completely misaligned with the stator magnetic segments. In either case no starting torque will result.

It has been suggested in the prior art that the input power factor for the disc reluctance motor is improved by inducing an axially directed static magnetic field of arbitrary magnitude within the magnetic circuit formed by the interleaved rotor and stator discs. However, a static field structure which realizes optimum power factor with respect to maximum average torque has not been disclosed by prior art devices.

It is well known that a polyphase motor provides a better ratio of peak torque to average torque than does a single phase motor. Accordingly, a two-phase disc reluctance motor has been disclosed which provides relatively smooth torque output. It has also been suggested by W. Heintz in U.S. Pat. No. 3,700,944, Oct. 24, 1972, that the problem of insufficient starting torque due to complete alignment or complete misalignment of disc portions can be overcome by use of the multi-phase disc construction provided that the magnetic portions of either the rotor or stator discs are displaced an arbitrary amount with respect to corresponding magnetic portions of other rotors or stators. However, a rational rotor-stator alignment arrangement for a polyphase disc motor which achieves maximum available starting torque regardless of rotor position has not been disclosed by prior art devices.

SUMMARY OF THE INVENTION

A polyphase disc-type variable reluctance motor is disclosed. A group of K single phase arrays, where K is a positive integer greater than 2 have interleaved disc rotors and stators and are supported in tandem within a frame with adjacent arrays separated by magnetic partitions. A first annular solenoid circumscribes each rotor-stator disc array and induces an axially directed dynamic electromagnetic field through the magnetic circuit formed by the interleaved rotor and stator discs contained therein. Polyphase operation is achieved by time shifting the dynamic field induced within the $N^{th}$ array by $(N-1)(2\pi/K)$ electrical radians with respect to the dynamic field induced within the first array, N being a positive integer from the set $(1, 2, \ldots, K)$. According to this arrangement, $N=1$ refers to the first array and $N=K$ refers to the last array of the tandem group.

The rotor and stator discs comprise a plurality of alternate high resistivity magnetic and high resistivity nonmagnetic segments of pitch $\rho$ mechanical radians, where $$\rho = \frac{2\pi}{2 \times \text{number of magnetic segments}}$$

Corresponding magnetic segments of adjacent stator discs within each array are in axial alignment with each other and are in axial alignment with corresponding magnetic segments of stator discs contained within adjacent arrays. Corresponding magnetic segments of adjacent rotor discs within each array are in axial alignment with each other, but magnetic segments of rotor discs contained within the $N^{th}$ array are angularly displaced by $(N-1)(2\rho/K)$ mechanical radians with respect to corresponding magnetic segments of rotor discs contained within the first array. In this geometric arrangement corresponding magnetic segments of interleaved rotor and stator disc are angularly displaced with respect to each other in at least $(K-1)$ arrays for any position of the rotor. Thus when a magnetic field is induced within each array a positive torque is produced by at least $(K-1)$ arrays as the rotor tends to rotate to the configuration of minimum reluctance (adjacent magnetic segments in exact alignment). The torque component contributed by a given array varies according to the amount of overlap of rotor and stator magnetic segments within that array; however, because of the complementary flux path arrangement of successive arrays the sum of individual torque components produced by all arrays is constant for any rotor position. Moreover, maximum available starting torque is provided by the minimum positive overlap arrangement of rotor and stator magnetic segments within successive arrays.

Improved input power factor is provided by a second annular solenoid which circumscribes each rotor-stator disc array and induces an axially directed static electromagnetic field through the magnetic circuit formed by the interleaved rotor and stator discs contained therein. Optimum input power factor with respect to maximum average torque is obtained by (1) adjusting the ampere turns of the second solenoid to produce a static flux component equal in magnitude to the modulus of the dynamic flux component, and (2) adjusting the ampere turns of the first and second solenoids such that the sum of the dynamic and static flux components equals the saturation limit of the array's magnetic structure.

DESCRIPTION OF THE PREFERRED EMBODIMENT

Figure 1:
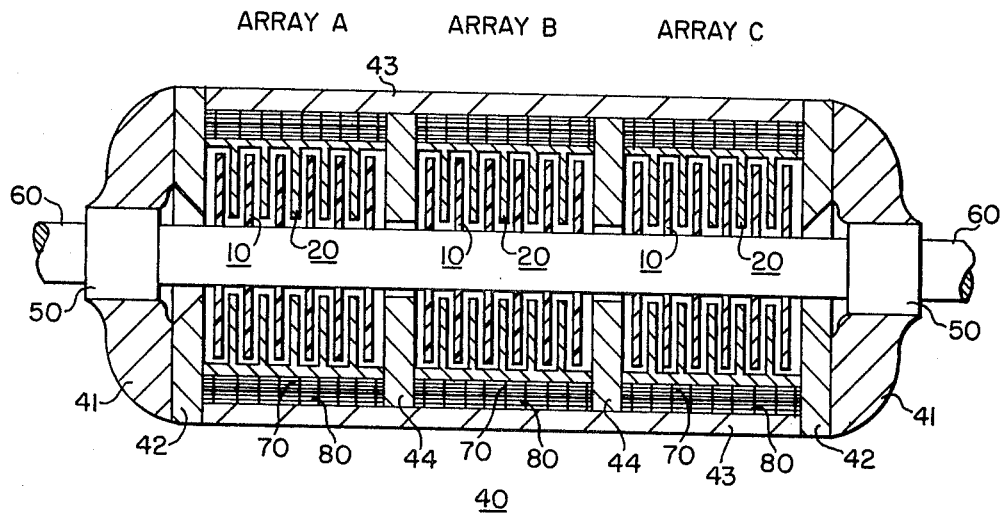
FIG. 1 is an elevation view, in section, of a three-phase disc reluctance motor.

Throughout the description which follows, like reference characters refer to like elements on all figures of the drawing.

A preferred embodiment of the present invention is illustrated in FIG. 1 which shows a three-phase disc reluctance motor ($K=3$). Single phase arrays A, B, and C are supported in tandem within a frame 40 with adjacent arrays separated by magnetic partitions 44. The frame 40 includes end plates 41 within which a centrally disposed shaft 60 is journaled for rotation about its axis by means of ball bearing assemblies 50.

A cylindrical flux return portion 43 circumscribes the arrays and is joined with magnetic partitions 44. The magnetic end portions 42 complete the flux return paths for the arrays A and C, respectively. The flux return portions and partitions are preferably made of a low carbon, ferro-magnetic metal such as cobalt alloy steel. The shaft, bearing assemblies, and end plates are preferably made of non-magnetic metal such as stainless steel.

A plurality of stator discs 20 are rigidly attached to the frame 40 within each array. Each stator disc 20 has a circular aperture through which shaft 60 passes as it rotates about its axis. The stator discs 20 are axially spaced within the cavity formed by the cylindrical flux return portion 43. Interleaved with the stator discs 20 are a plurality of rotor discs 10 which are rigidly attached to and axially spaced along the shaft 60 to define a plurality of radial air gaps between rotor-stator pairs. The rotor discs 10 and stator discs 20 are preferably equally spaced with respect to each other and with respect to the surrounding structure. For simplicity, the disc structure connected rigidly to the shaft is called the "rotor" while the other stack of discs is called the "stator," even though contrarotation is possible.

Figure 2:
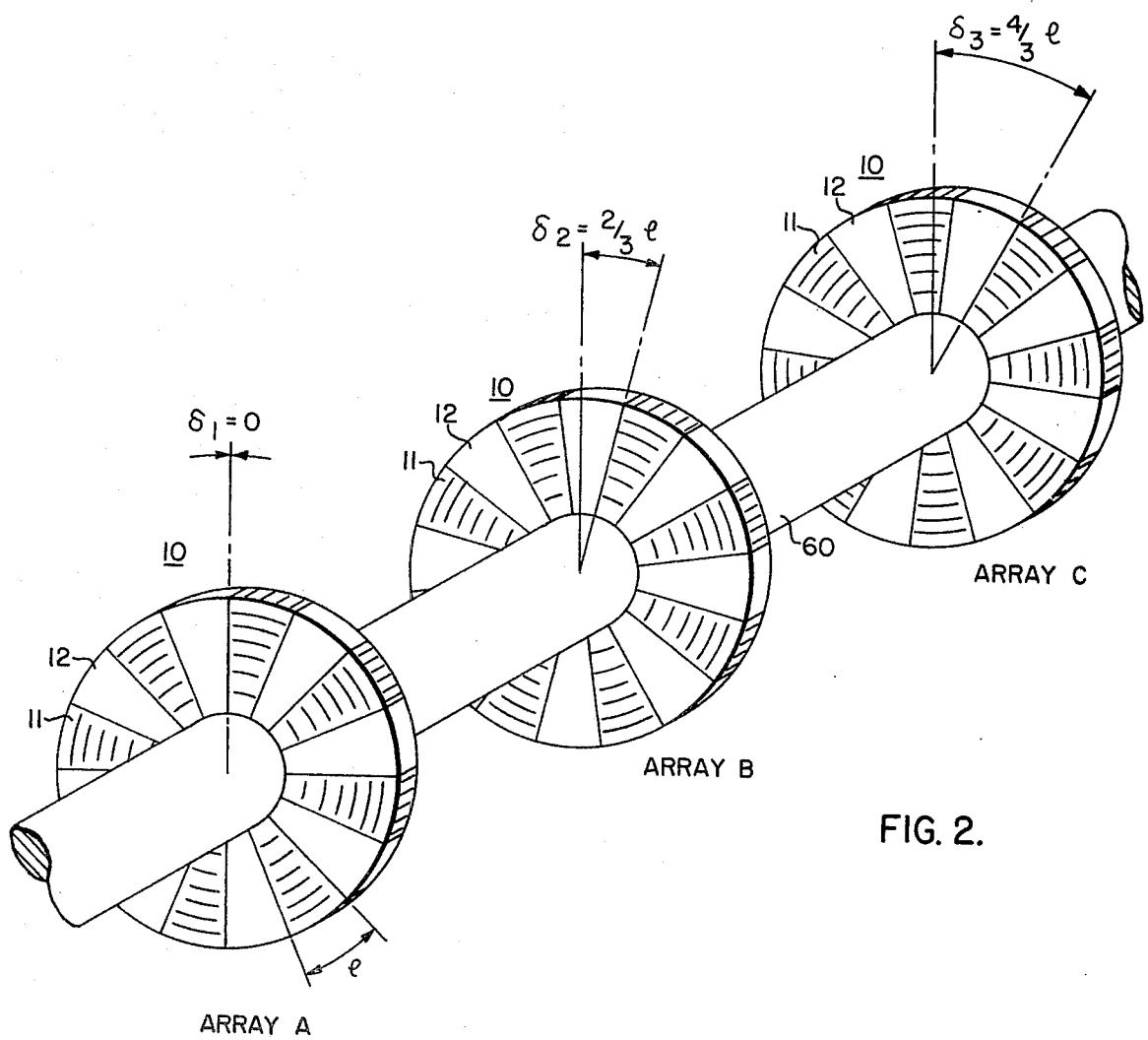
FIG. 2 is an isometric view of a rotor which illustrates the angular displacement of rotor discs.

Each rotor disc 10 is composed of alternate high resistivity magnetic segments 11 and high resistivity non-magnetic segments 12 as shown by the shaded and non-shaded portions of FIG. 2. The stator discs 20 are identical in construction to the rotor discs 10. The magnetic and non-magnetic segments are preferably equal in radial length and angular pitch. For synchronous operation at a rotor speed of $n$ rpm and excitation of $f$ cps, the number $m$ of magnetic segments required for each disc is given by the relation $$m = 60f/n \text{ for the case with DC bias;}$$

$$m = 120f/n \text{ for pure AC excitation.}$$

Since there are an equal number of non-magnetic segments, the total number of segments per disc is $2m$, and the pitch $\rho$ of each segment may be calculated by the relation $$\rho = 2\pi/2m = m\pi/60f \text{ mechanical radians for DC bias;}$$

$$\rho = n\pi/120f \text{ mechanical radians for AC bias.}$$

A first annular solenoid 70, adapted for connection to a source of alternating current (not shown), circumscribes each rotor-stator disc array and induces an axially directed dynamic electromagnetic field through the magnetic circuit formed by the interleaved rotor disc 10 and the stator discs 20 contained therein. The solenoid 70 is comprised of a specified number of turns of insulated copper wire, and its cross-section as shown in FIG. 1 is substantially rectangular. Three-phase operation is achieved by time shifting the dynamic fields induced within the three arrays. For three-phase synchronous operation, the excitation applied to the solenoid 70 of array B is shifted $2\pi/3$ electrical radians with respect to the excitation applied to the solenoid 70 of array A and the excitation applied to the solenoid 70 of array C is shifted $4\pi/3$ electrical radians with respect to the excitation applied to the solenoid of array A. The time shift required for each array may be calculated from the relation $$\tau N,K = (N-1)(2\pi/K) \text{ electrical radians } (K>2), \text{ and}$$

$$\tau N = \tfrac{2}{3}(N-1)\pi \text{ for 3 phase operation } (K=3)$$

where:
  $N$ indicates the numerical array sequence, $K$ indicates the total number of arrays.

The table below illustrates the general shifting scheme for $K$ arrays, where $K$ may be any positive integer:

| Number of Arrays | $\tau 1$ | $\tau 2$ | $\tau 3$ | $...\tau N$ |
|---|---|---|---|---|
| 1 | 0 | | | |
| 2 | 0 | $1/2\pi$ | | |
| 3 | 0 | $2/3\pi$ | $4/3\pi$ | |
| . | . | | | |
| . | . | | | |
| . | . | | | |
| K | 0 | $1(2/K)\pi$ | $2(2/K)\pi$ | $..(N-1)(2/K)\pi$ |

When the first annular solenoids 70 are energized, magnetic flux $\psi$ is forced axially through the stator and rotor discs which tend to align in a minimum reluctance configuration. If the excitation to each solenoid is time varying as described above, and the shaft 60 is rotating so that the magnetic segments 11 of the rotor discs 10 and stator discs 20 are synchronously aligning with flux pulsations, the three-phase structure produces a net average torque.

This instantaneous torque $T$ produced by an individual array is given by the following expression:

$$T = -\frac{1}{2}\Psi^2 \, dR/d\theta$$

where:
$\psi$ is the air gap flux, and
$dR/D\theta$ is the rate of change of reluctance $R$ with respect to angular shaft position $\theta$.

If the number of magnetic segments is increased, the variation of $dR/d\theta$ will increase as long as the air gap spacing between discs is small compared to the pitch $\rho$ of the segments 11. The maximum flux $\psi$ remains unchanged since the total area of the magnetic circuit is the same and therefore the torque output increases as the number of magnetic segments increases. Motor speed, $n$, is proportional to:

$$nd(f/m)$$

where:
$f$ is the frequency of excitation, and
$m$ is the number of magnetic segments per disc.

So for a given shaft speed it is possible to increase m while maintaining the ratio of $f/m$ constant thereby increasing the motor torque. The motor power output, which is the product of motor torque and shaft speed, is thereby increased without increasing motor volume.

Positive starting torque is assured by the complementary flux path arrangement of the successive arrays A, B, and C. Further, the maximum available starting torque is realized by the minimum positive overlap arrangement of rotor and stator magnetic segments 11 within successive arrays. In the arrangement shown in FIGS. 1 and 2, corresponding magnetic segments 11 of adjacent stator discs 20 are in axial alignment with each other within array A and are in axial alignment with corresponding magnetic segments 11 of stator discs 20 contained within adjacent arrays B and C. That is, when viewed in a direction normal to the flat surface of the stator discs 20, corresponding magnetic segments 11 of stator discs 20 in each successive array A, B, and C appear to be perfectly superimposed upon each other. Magnetic segments 11 of the interleaved rotor discs 10 are angularly displaced $(N-1)(2/K)\rho$ radians with respect to a given reference in order to establish complementary flux paths with minimum positive overlap within successive arrays. For the three-phase arrangement of FIG. 1, and taking the rotor discs of array A as reference, the magnetic segments of each rotor disc 10 of array B are angularly displaced $\frac{2}{3}\rho$ radians with respect to those of array A, and the magnetic segments of each rotor disc 10 of array C are angularly displaced $(4/3)\rho$ radians with respect to those of array A. In this arrangement the rotor and stator segments in at least two of the three arrays will always be angularly displaced so that a positive starting torque may be produced regardless of rotor position. Furthermore, since the rotor segments 11 of the successive arrays A, B, and C are displaced equally in a complementary fashion, minimum positive overlap of rotor and stator magnetic segments is obtained thus assuring maximum available starting torque for any position of rotor 60. The complementary flux path arrangement is also obtained by angularly displacing magnetic segments of the stator discs 20 in the same fashion and disposing the magnetic segments of the rotor discs 10 in alignment with each other from array to array.

A second annular solenoid 80, adapted for connection to a source of direct current (not shown), circumscribes each rotor-stator disc array and induces an axially directed static electromagnetic field through the magnetic circuit formed by the interleaved rotor discs 10 and stator discs 20 contained therein. Each second annular solenoid 80 is comprised of a specified number of turns of insulated copper wire and its cross-section as shown in FIG. 1 is substantially rectangular. The second annular solenoids 80 of each array A, B, and C are connected in electrical series relationship with each other and with a source of direct current (not shown) so that the fundamental components of the induced voltages will sum to zero, thereby eliminating the large series impedance which would otherwise be required for each solenoid 80 to maintain the requisite constant d-c current bias.

It has been determined experimentally that a static magnetic field of arbitrary magnitude as described above will improve the input power factor of the disc reluctance motor. The following analysis describes the relationship between the static field, torque, and power factor and defines a static field structure which realizes optimum input power factor with respect to maximum average torque for the disc reluctance motor of FIG. 1.

The three-phase structure of FIG. 1 essentially consists of three independent single phase motors A, B, and C with a common shaft 60. If an alternating sinusoidal voltage $V_a$ of frequency $\omega$ $$v\,a = \sqrt{2}\,V_a \sin \omega t \qquad (1)$$

is applied to the first annular solenoid phase winding 70 with $N_a$ turns, assuming negligible ohmic resistance drops, the induced voltage is $$v\,a = N_a \,(d\omega/dt) \qquad (2)$$

as per Faraday's law. The integration of Equation (2) yields the flux $\phi(t)$ $$\phi(t) = -\theta_A \cos \omega t + \phi_o \qquad (3)$$

where:

$$\phi_A = \frac{\sqrt{2}V_a}{\omega N_a} \quad (4)$$

and $\phi_o$ is a constant of integration, i.e., a static flux term, that may result from the magnetomotive force $N_F I_F$ of the DC current $I_F$ flowing in the $N_F$ turns of the static solenoid 80. No matter how the reluctance of the flux path may be modulated by the revolving shaft 60, the assumption of the sinusoidal voltage source as per Equation (1) implies that the time varying component of the flux is at the fundamental frequency $v$, without higher harmonics; the modulations of the flux path reluctance rather call for harmonics in the waveform of the AC current, as shall be seen later in detail.

If a certain flux $\phi(t)$ exists at a certain instant, a torque $T(t)$ acts upon the rotor 60, trying to line up the magnetic segments 11 of the rotor 10 and the stator 20, minimizing the reluctance $R$ of the flux path. As derived in textbooks, e.g., A. E. Fitzgerald & C. Kingsley, *Electric Machinery*, McGraw Hill Co., 1952, pages 63, the instantaneous torque produced by one phase, such as array A, is $$T(t) = -\tfrac{1}{2}\phi^2(t)(dR/d\theta) \quad (5)$$

where $\theta$ is the angular displacement of the rotor shaft from a certain reference on the stator 20 and R is the shaft position dependent flux path reluctance. In the motor of FIG. 1 with m equally spaced magnetic segments per disc the reluctance R is a periodic function of the angle $m\theta$, and can be expressed by a Fourier series. Truncating this series at the second term $$R(\theta) = R_o + R_\Delta \cos m\theta \quad (6)$$

where the reference position, $\theta = 0$, is chosen for a position of maximum reluctance, i.e., of maximum misalignment of stator and rotor magnetic segments.

Figure 3:
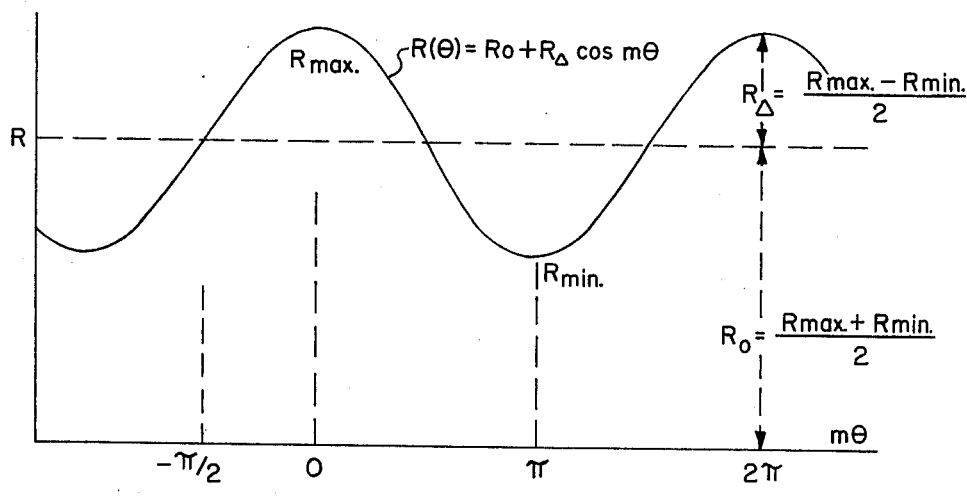
FIG. 3 is a graph of air gap reluctance versus shaft displacement for the three-phase motor of FIG. 1.

Referring to FIG. 3, $$R_\Delta = \frac{R_{max} - R_{min}}{2}$$

Using Equations (3) and (6), Equation (5) is rewritten $$T(t) = \tfrac{1}{2}\phi^2(t) m R_\Delta \sin m\theta \quad (7)$$

$$= \tfrac{1}{2}(\phi_o^2 + \phi_A^2 \cos^2 \omega t - 2\phi_o \phi_A \cos \omega t) m R_\Delta \sin m\theta$$

If the shaft revolves with a constant angular velocity $\Omega = d\theta/dt$ with respect to the stator 20, the instantaneous angular position of the shaft 60, $\theta$, is expressed by $$\theta(t) = \Omega t - \gamma \quad (8)$$

where $\gamma$ is an arbitrary timing angle. If $\Omega$ is an integer submultiple of the electric angular frequency $\omega$, $-\gamma$ is the angle by which the shaft 60 is lagging a position of maximum misalignment at the instant $t=0$ at which $v_A$ passes through zero ascendingly as per Equation (1). From Equation (7), it is seen that a net average torque is obtained if case $a$:

$$\Omega = 2\omega/m, \quad (9)$$

or also if case $b$:

$$\Omega = \omega/m. \quad (10)$$

Case $a$: Synchronous Speed $\Omega = 2\omega/m$. The average torque is $$T_{av} = (\phi_A^2/8) m R_\Delta \sin m\gamma \quad (11)$$

$T_{av}$ is positive (i.e., motoring) if $\sin m\gamma > 0$ and its maximum possible value $$(T_{av})_{max} = (\phi_A^2/8) m R_\Delta \quad (12)$$

occurs for $m\gamma = \pi/2$ (i.e., if $m\theta = \pi/2$) at $t=0$ when $v_a$ passes through zero ascendingly. Note that when $m\theta = \pi/2$, $R = R_o$ i.e., the rotor magnetic sectors 11 are half-way misaligned with the magnetic sectors 11 of the stator 20. The reluctance, i.e., the misalignment, increases from there.

In this type of operation the static bias flux $\phi_o$ does not contribute to the average torque and would only unfavorably affect the instantaneous torque pulsations and the harmonic contents of the $i_a$ current. With $\phi_o = 0$ the instantaneous current $i_a(t) = \phi(t)R(t)/Na$ for the condition of maximum output, i.e., $m\gamma = \pi/2$ becomes $$i_a(t) = \frac{\phi_A R_\Delta}{2 Na} \sin \omega t - \frac{\phi_A R_o}{Na} \cos \omega t + \frac{\phi_A R_\Delta}{2 Na} \cos 3\omega t \quad (13)$$

The first term is the fundamental frequency current component in phase with the input voltage $v_a$. Therefore, the input power (per phase) is $$\text{Watts} = V_a \frac{\phi_A R_\Delta}{\sqrt{2} \; 2 Na} = \omega \frac{\phi_A^2 R_\Delta}{4} \quad (14)$$

This expression checks with the mechanical output power per phase, $(T_{av})_{max} \Omega$, for this substantially lossless system. Defining "power factor" for this substantially sinusoidal situation as the ratio $$pf \triangleq \frac{I_{rms} \text{ of watt component}}{I_{rms} \text{ of total current}} = \frac{\text{Watts}}{\text{Volt Amps}}, \quad (15)$$

one obtains $$(pf)_{max \; output} = \frac{R_\Delta}{\sqrt{2}\sqrt{R_\Delta^2 + 4 R_o^2}}$$

$$= \frac{1}{\sqrt{2}\sqrt{1 + 2(R_o/R_\Delta)^2}} \quad (16)$$

For a typical example of design with $R_\Delta = 0.3 R_o$, $(pf)_{max \; output} = 0.147$ lagging; that is, very large inductive reactive kVA are associated with mechanical KW delivered, with very objectionable consequences in terms of motor design and inverter components.

Case $b$: Synchronous speed $\Omega = \omega/m$. With $\theta = \omega/m - \gamma$, from Equation (7)

$$T_{av} = (\phi_o \phi_A/2) m R_\Delta \sin m\gamma. \quad (17)$$

In particular, for $m\gamma = \pi/2$, the maximum output torque is $$(T_{av})_{max} = (\phi_o \phi_A/2) m R_\Delta \quad (18)$$

with instantaneous torque pulsation given by $$T(t) - (T_{av})_{max} = \frac{-mR_\Delta}{2}\left\{\left(\phi_o^2 + \frac{3}{4}\phi_A^2\right)\cos\omega t - \phi_o\phi_A\cos 2\omega t - \frac{\phi_A^2}{4}\cos 3\omega t\right\} \quad (19)$$

The instantaneous alternating current $i_a$, for an arbitrary value of the phasing angle $m\gamma$, is obtained now from $$N_F I_F + N_a i_a = \phi(t)R(t) = \phi_o R_o - \phi_A(R_\Delta/2)\cos m\gamma + \phi_o R\cos m\gamma\cos\omega t + \phi_o R\sin m\gamma\sin\omega t - \phi_A(R/2)\cos(2\omega t - m\gamma) \quad (20)$$

For given values of $\phi_o$ and $\phi_A$, $$N_F I_F = \phi_o R_o - \phi_A(R_\Delta/2)\cos m\gamma \quad (21)$$

and $$i_a(t) = \left(\frac{\phi_o R_\Delta}{Na}\sin m\gamma\right)\sin\omega t + \left(\frac{\phi_o R_o}{Na}\cos m\gamma\right)\cos\omega t - \left(\frac{\phi_A R_o}{Na}\right)\cos\omega t = \frac{\phi_A R_\Delta}{2Na}\cos(2\omega t - m\gamma) \quad (22)$$

The first term of Equation (22) is the fundamental frequency component of the AC current in phase with the input voltage $v_a$. Hence the power input per phase is $$\text{Watts} = V_A \frac{\phi_o R_\Delta}{\sqrt{2}Na}\sin m\gamma \quad (23)$$

which, according to Equations (10) and (17) agrees with the mechanical power output $T_{av}\Omega$, in the substantially lossless system. The second and third terms of Equation (22) are fundamental frequency current components in quadrature with the voltage, respectively leading and lagging. Practically $\phi_A R_o$ is likely to be larger than $\phi_o R_\Delta \cos m\gamma$, so that the net quadrature current is lagging. Finally, the fourth term is a current component at twice the fundamental frequency.

Evidently the principle of operation of the DC biased motor is different from that of conventional reluctance motors without DC excitation. It can be said that the relative motion of the magnetic segments modulates the flux produced by the DC current, inducing a fundamental frequency electromotive force in the AC winding and altering the AC current required from the AC supply. For a given magnetic structure (i.e., given magnetic segments, flux collectors and yokes) consideration of saturation limit the allowable peak of the total flux to a certain value $\phi_{peak}$. The presence of a DC flux component $\phi_o$ therefore compels lower values of the alternating $\phi_A$ with the constraints $$\phi_o + \phi_A = \phi_{peak}. \quad (24)$$

With this constraint, Equation (17) indicates that the condition $\phi_o = \phi_A$ provides the maximum possible full output torque $$(T_{av})_{max} = \frac{\phi_{peak}^2 mR_\Delta}{8}. \quad (25)$$

This value coincides with the full output torque of the operation Case $a$, without bias at the synchronous speed $$\Omega = 2\omega/m$$

where $\phi_A = \phi_{peak}$.

A DC component of flux can be introduced, without the addition of a static $N_F$ solenoid winding, if the primary excitation circuit produces a current in the N solenoid winding which alternates about a non-zero average. In the limit the condition $\phi_o = \phi_A$ can be approximated in this way. However, for a variety of design considerations, and in particular for a more effective reduction of the primary exciter component rating, higher values of the ratio $\phi_o/\phi_A$ are desirable (e.g., $\phi_o/\phi_A = 3$), even though the pull out torque of Equation (17) is somewhat degraded from the highest possible value given by Equation (25) with the further disadvantages of separate $N_F$ coils and additional copper weights.

Defining $$\alpha \triangleq \frac{\phi_o}{\phi_o + \phi_a} = \frac{\phi_o}{\phi_{peak}} \quad (26)$$

Equation (18) is rewritten $$(T_{av})_{max} = \alpha(1-\alpha)\phi_{peak}^2 m(R_\Delta/2) \quad (27)$$

while, from Equation (22) with $m\gamma = \pi/2$, the power factor, as defined by Equation (15) is $$(pf)_{max\ output} = \frac{\alpha}{\sqrt{\alpha^2 + (\beta^2 + \frac{1}{4})(1-\alpha)^2}}$$

$$= \frac{1}{\sqrt{1 + \left(\frac{1-\alpha}{\alpha}\right)^2(\beta^2 + \frac{1}{4})}}$$

where $\beta \triangleq R_o/R_\Delta$ is a constant resulting from the disc system design.

Figure 4:
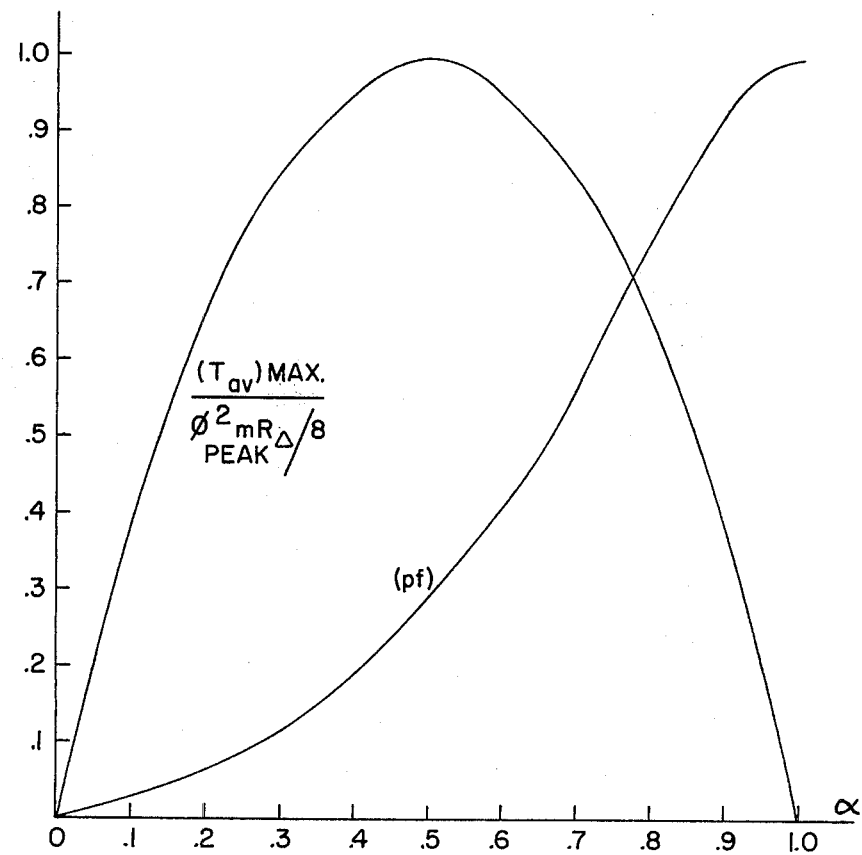
FIG. 4 is a set of waveforms illustrative of the operation of the three-phase motor of FIG. 1.

FIG. 4 shows plots of $(T_{av})_{max}$, normalized to its highest possible value $(T_{av})_{max}$ and of the corresponding power factor for various values of $\alpha$, for the case of magnetic sectors with modulation ratio $X = R_\Delta/R_o = 0.292$, i.e., $\beta = 3.43$. For the synchronous operation in question, i.e., $\Omega = \omega/m$, the pull out torque and the power factor both increase for $\alpha$ increasing from zero. The pull out torque reaches its highest value at $\alpha = 0.5$ (i.e., $\phi_o = \phi_A = \phi_{peak/2}$), but there the power factor is still quite low, i.e., $pf = 0.27$. Further increases of $\alpha$ cause further improvements of the power factor, although the pull out torque decays. For instance for $\alpha = 0.75$ (i.e., $\phi_o = 3\phi_A$), the power factor becomes $pf = 0.66$, with the pull out torque degraded to 74%. The intersection of the two curves indicates a value of $\alpha = 0.8$ (i.e., $\phi_o = 4\phi_A$) for optimum pull out torque and power factor.

The $\alpha$ ratio affects also the amplitudes of the time varying components of the instantaneous torque, as seen in Equation (19) in the case of full output. In the three-phase assembly, the fundamental frequency components and also the second harmonics cancel out. The amplitude of the remaining third harmonic component, normalized to the average torque of Equation (17) is given by $$\frac{T_{3rd}}{T_{av}} = \frac{\phi_A 2/4}{\phi_o \phi_A} = \frac{1-\alpha}{4\alpha} \qquad (29)$$

For optimum power factor and pull out torque ($\alpha = 0.8$), $$\frac{T_{3rd}}{T_{av}} = \frac{1-\alpha}{4\alpha} = \frac{1}{16} \qquad (30)$$

Thus, pull out torque may be "traded off" for improved power factor and torque ripple in the polyphase disc reluctance machine by a compromise in the choice of $\alpha$.

We claim:

1. A polyphase variable reluctance dynamoelectric machine comprising:
a frame;
a shaft mounted for rotation within said frame;
a group of $K$ rotor-stator arrays supported in tandem within said frame, $K$ being a positive integer greater than 2, said group comprising a first array, a last array, and an array intermediate of said first and last arrays;
each of said rotor-stator arrays comprising one or more axially spaced stator discs secured to said frame and one or more axially spaced rotor discs secured to said shaft, said rotor and stator discs being arranged in interleaved relation one with another and spaced apart to define an axial air gap therebetween;
each of said rotor and stator discs comprising a plurality of magnetic and non-magnetic segments, a non-magnetic segment being disposed intermediate of two of said magnetic segments, said magnetic and non-magnetic segments having a pitch of $\rho$ mechanical radians;
corresponding magnetic segments of adjacent stator discs being disposed in alignment with each other within each array and in alignment with corresponding magnetic segments of said stator discs contained within adjacent arrays; and
corresponding magnetic segments of adjacent rotor discs being disposed in alignment with each other within each array, the magnetic segments of said rotor discs contained within the $N^{th}$ array being angularly displaced by $(N-1)(2/K)\rho$ mechanical radians with respect to corresponding magnetic segments of the rotor discs contained within said first array, N being a positive integer from the set of integers $(1,2, \ldots, K)$, $N=1$ referring to said first array and $N=K$ referring to said last array.

2. A polyphase variable reluctance dynamoelectric machine as defined in claim 1 including means for inducing an axially directed dynamic magnetic field through the magnetic circuit formed by said interleaved rotor and stator discs contained within each of said $K$ arrays, said dynamic magnetic field induced within the $N^{th}$ array being time shifted by $(N-1)(2/K)\pi$ electrical radians with respect to the dynamic magnetic field induced within said first array.

3. The polyphase variable reluctance dynamoelectric machine of claim 2 wherein said means for inducing an axially directed dynamic magnetic field through the magnetic circuit formed by said interleaved rotor and stator discs comprises a plurality $K$ of first excitation windings, $K$ being a positive integer greater than 2, one of said first excitation windings circumscribing the interleaved rotor and stator discs of each said array, said first excitation windings being adapted for excitation by an alternating current source, said first excitation windings circumscribing said $N^{th}$ array being excited by an alternating electrical current from said current source which is time shifted by $(N-1)(2/K)\pi$ electrical radians with respect to the electrical current applied to said first excitation winding associated with said first array.

4. The polyphase variable reluctance machine of claim 3 wherein said first excitation windings are excited by an electrical current which alternates about a non-zero average, whereby an axially directed static magnetic field is produced in addition to said axially directed dynamic magnetic field by said first excitation windings, the non-zero average alternating current flowing in said first excitation winding associated with the $N^{th}$ array being time shifted by $(N-1)(2/K)\pi$ electrical radians with respect to the non-zero average alternating current flowing in said first excitation winding associated with said first array.

5. A polyphase variable reluctance dynamoelectric machine as defined in claim 2 including means for inducing an axially directed static magnetic field through the magnetic circuit formed by said interleaved rotor and stator discs.

6. A polyphase variable reluctance dynamoelectric machine as defined in claim 5 including magnetic return path means associated with the magnetic circuit provided by said interleaved magnetic segments of said rotor and stator discs, the sum of the magnitude of the magnetic flux component of said static magnetic field and the modulus of the magnetic flux component of said dynamic magnetic field being substantially equal to the saturation limit of the combined magnetic circuit provided by said interleaved magnetic segments and said magnetic return path means.

7. A polyphase variable reluctance dynamoelectric machine as defined in claim 6, the magnitude of the magnetic flux component of said static magnetic field being substantially equal to the modulus of the magnetic flux component of said dynamic magnetic field.

8. A polyphase variable reluctance dynamoelectric machine as defined in claim 5 wherein said means for inducing said axially directed static magnetic field comprises a plurality $K$ of second excitation windings, $K$ being an integer greater than 2, there being one of said second excitation windings circumscribing the interleaved rotor and stator discs of each array, said second excitation windings being adapted to receive excitation from a direct current source, said static magnetic field being provided by the magnetomotive force established by direct current flowing from said direct current source through said second excitation windings.

9. A polyphase variable reluctance dynamoelectric machine as defined in claim 8, said second excitation windings being connected in series electrical relationship one to another whereby the magnetic flux components produced by said second excitation windings add together to provide the desired static magnetic field.

10. The polyphase variable reluctance machine of claim 1 wherein $K=2$ arrays; corresponding magnetic segments of adjacent rotor discs being disposed in alignment with each other within each array; the magnetic segments of said rotor discs contained within the second array being angularly displaced by $\rho/2$ mechanical radians with respect to corresponding magnetic segments of the first array.

11. In a polyphase variable reluctance dynamoelectric machine of the type having a plurality of tandemly disposed rotor and stator arrays, each array including a plurality of axially spaced, interleaved rotor and stator discs, each one of said rotor and stator discs having a magnetic segment alternately disposed with a non-magnetic segment, said magnetic and non-magnetic segments being of equal pitch, an improved flux path arrangement for said interleaved rotor and stator discs which comprises:
- corresponding magnetic segments of adjacent stator discs being disposed in alignment with each other within each array and in alignment with corresponding magnetic segments of said stator discs contained within adjacent arrays; and
- corresponding magnetic segments of adjacent rotor discs being disposed in alignment with each other within each array and being angularly displaced with respect to corresponding magnetic segments of said rotor discs contained within adjacent arrays, the net angular displacement from array to array being a predetermined constant, and the sum of said net angular displacements being substantially equal to the pitch of said segments.

12. In a polyphase variable reluctance dynamoelectric machine of the type having a plurality of tandemly disposed rotor and stator arrays, each array including a plurality of axially spaced, interleaved rotor and stator discs, each one of said rotor and stotor discs having a magnetic segment alternately disposed with a nonmagnetic segment, said magnetic and nonmagnetic segments being of equal pitch, an improved flux path arrangement for said interleaved rotor and stator discs which comprises:
- corresponding magnetic segments of adjacent rotor discs being disposed in alignment with each other within each array and in alignment with corresponding magnetic segments of said rotor discs contained within adjacent arrays; and
- corresponding magnetic segments of adjacent stator discs being disposed in alignment with each other within each array and being angularly displaced with respect to corresponding magnetic segments of said stator discs contained within adjacent arrays, the net angular displacement from array to array being a predetermined constant, and the sum of said net angular displacements being substantially equal to the pitch of said segments.

* * * * *